United States Patent
DeGarrido et al.

(10) Patent No.: US 7,933,328 B2
(45) Date of Patent: Apr. 26, 2011

(54) RATE CONTROL FOR DIGITAL VIDEO COMPRESSION PROCESSING

(75) Inventors: Diego P. DeGarrido, Newtown, PA (US); Paul L. Gehman, Doylestown, PA (US)

(73) Assignee: Broadcom Corporation, Irvine, CA (US)

( * ) Notice: Subject to any disclaimer, the term of this patent is extended or adjusted under 35 U.S.C. 154(b) by 1542 days.

(21) Appl. No.: 11/049,103

(22) Filed: Feb. 2, 2005

(65) Prior Publication Data
US 2006/0171457 A1 Aug. 3, 2006

(51) Int. Cl.
*H04N 11/04* (2006.01)
*H04N 7/12* (2006.01)

(52) U.S. Cl. ............................... 375/240.03; 375/240.12

(58) Field of Classification Search ............ 348/390, 348/415, 405, 409, 420, 400, 401, 402, 410, 348/411, 412, 413, 414, 419, 426, 700, 96; 382/232, 236, 238, 251; 375/240.02, 240.03, 375/240.2, 240, 240.12, 240.25
See application file for complete search history.

(56) References Cited

U.S. PATENT DOCUMENTS

| | | | | |
|---|---|---|---|---|
| 5,929,916 | A * | 7/1999 | Legall et al. | 375/240.05 |
| 6,219,067 | B1 * | 4/2001 | Dieterich | 345/440 |
| 2002/0064228 | A1 * | 5/2002 | Sethuraman et al. | 375/240.12 |
| 2005/0162547 | A1 * | 7/2005 | Kuroda et al. | 348/448 |
| 2006/0165163 | A1 * | 7/2006 | Burazerovic et al. | 375/240.03 |
| 2007/0189380 | A1 * | 8/2007 | Goh et al. | 375/240.03 |

OTHER PUBLICATIONS

"A Bit Allocation Method Based on Picture Activity for Still Image Coding", by Wook Joong Kim et al., IEEE Transactions on Image Processing, vol. 8, No. 7, Jul. 1999, pp. 974-977.
"Rate Distortion Theory a Mathematical Basis for Data Compression", by Toby Berger, 1971, 4 pages.
"Discrete Cosine Transform Algorithms, Advantages Applications", by K.R. Rao and P. Yip, 1990, pp. 186-189.
"A New Algorithm on MPEG-2 Target Bit-Number Allocation at Scene Changes", by Li-Jun Luo et al., IEEE Transactions on Circuits and Systems for Video Technology, vol. 7, No. 5, Oct. 1997, pp. 815-819.
"A Perceptually Efficient VBR Rate Control Algorithm", by Mark R. Pickering et al., IEEE Transactions on Image Processing, vol. 3, No. 5, Sep. 1994, pp. 527-532.

* cited by examiner

*Primary Examiner* — Behrooz Senfi
(74) *Attorney, Agent, or Firm* — McAndrews, Held & Malloy, Ltd.

(57) ABSTRACT

A video compression algorithm for converting a digital video stream having video content into a compressed video bitstream, includes rate control to control the size of the compressed video bitstream. The rate control takes into account two or more of (1) detected scene changes, (2) detected repeated fields resulting from inverse telecine processing, (3) characterized video content complexity, and (4) a determined level of a model of a bit buffer associated with a decoder adapted to decode the compressed video bitstream. In preferred embodiments, the rate control takes into account two or more of these four factors in an integrated manner to change the allocation of bits for encoding different portions of the video stream.

26 Claims, 6 Drawing Sheets

FIG. 1(a)

b; denotes bits per frame generated by the encoding process

Original film video (24 Fps) pre 3:2 Pulldown process

T: top_field
B: bottom_field

(a)

Converted video (30Fps) post 3:2 pulldown process (b)

Restored film but with MPEG2 flag assignment top_field_first=1
repeat_first_field=1
progressive_frame=1 top_field_first=1
repeat_first_frame=0
progressive_frame=0,1 top_field_first=0
repeat_first_field=0
progressive_frame=0,1 top_field_first=0
repeat_first_field=0
progressive_frame=1

RATE CONTROL FOR DIGITAL VIDEO COMPRESSION PROCESSING

BACKGROUND OF THE INVENTION

1. Field of the Invention

The present invention relates to digital video compression, and, in particular, to rate control for digital video compression processing conforming to the MPEG2 video standard.

2. Description of the Related Art

In digital video compression, the video encoder typically attempts to maintain uniform video quality throughout the video sequence, since changes in video quality result in a poor viewing experience. Constant viewing quality for a given bit-rate is in general the main goal of a rate-control algorithm.

The MPEG2 (Motion Picture Experts Group 2) video committee released the TM5 (Test Model 5) video encoder software model for the MPEG2 digital video compression standard. See ISO-IEC/JTC1/SC29/WG11/N0400, "Coded representation of picture and audio information—MPEG2 Test Model 5 (version 2), April 1993, and ISO/IEC 13818-2, "Information Technology—Generic Coding of Moving Pictures and Associated Audio Information: Video," 2000, the teachings of both of which are incorporated herein by reference. It is well known that TM5 rate control has several deficiencies. The main reason for its release by the MPEG2 video committee was to exemplify how rate control could be achieved for video sources.

SUMMARY OF THE INVENTION

Problems in the prior art are addressed in accordance with the principles of the present invention by a rate control algorithm that takes into account one or more of (1) scene changes, (2) inverse telecine, (3) visual masking, (4) a posteriori video complexity analysis, and (5) video buffering verifier (VBV) compliance. The invention can be implemented for either constant bit rate or variable bit rate applications.

In one embodiment, the present invention is a method, a video encoder, and a machine-readable medium, having encoded thereon program code, for applying a video compression algorithm to a digital video stream having video content to generate a compressed video bitstream. The video compression algorithm includes rate control adapted to control size of the compressed video bitstream, where the rate control takes into account two or more of (1) detected scene changes, (2) detected repeated fields resulting from inverse telecine processing, (3) characterized video content complexity, and (4) a determined level of a model of a bit buffer associated with a decoder adapted to decode the compressed video bitstream. The present invention can also be embodied as a machine-readable medium having encoded thereon a compressed video bitstream generated by implementing a method of the present invention.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

The MPEG2 TM5 rate-control algorithm has limited commercial value, since it does not take into account certain characteristics of video sequences, such as scene changes, film and video modes, and busy and easy scenes. Scene changes typically involve transitions between levels of video complexity. A rate-control algorithm that detects scene changes can allocate more bits to maintain constant quality.

Film typically has a frame-rate of 24 frames/sec, while video typically has a frame-rate of 30 frames/sec. A typical video broadcast can contain film that has been up-converted to video by a technique called telecine. Telecine repeats film frames in order to achieve the target 30 frames/sec. This redundancy can be removed by the video encoder and taken into account in the rate-control algorithm.

Some scenes are naturally more complex than others, due to motion and regions of fine detail. To maintain constant quality, rate-control algorithms can identify complex scenes and assign more bits to them.

Bit assignment can follow a buffer model having a finite buffer size for applications where compressed bitstreams are stored or transmitted with finite media (space) or channel capacity.

All these factors are neglected by TM5 rate control. Nonetheless, TM5 provides a framework for video rate control. The next section describes the TM5 rate-control implementation. Some fundamental concepts in rate-distortion theory are also presented in this section, since rate distortion provides information theory models that are often employed in rate-control algorithms.

Rate Control as Defined by TM5

Laplacian Rate-Distortion Function

In the great majority of video and image coding standards, such as MPEG, intra and inter blocks are transformed by discrete cosine transform (DCT), and then the DCT coefficients are adaptively quantized according to the given bit-rate and picture activity. It is widely accepted in the literature that the probability density function of DCT coefficients can be modeled through a well-adjusted Laplacian probability density function.

The Laplacian probability density function has the functional form of Equation (1) as follows:

$$f_x(x) = \frac{2}{\sigma^2} e^{-\frac{2|x|}{\sigma^2}},\qquad(1)$$

where $-\infty < x < +\infty$ and $\sigma^2$ denotes source variance.

Using the absolute value, $D(x, y)=|x-y|$, as a measure of the distortion, it is known that a closed-form solution for the rate-distortion function is possible. Consequently, the rate-distortion function R(D) of a Laplacian source is given by Equation (2) as follows:

$$R(D) = \ln\left(\frac{\sigma^2}{2D}\right),\qquad(2)$$

where the minimum distortion $D_{min}=0$ and the maximum distortion $$D_{max} = \frac{\sigma^2}{2}.$$

If expanded in a power series, the rate distortion function of Equation (2) yields Equation (3) as follows:

$$R(D) = -\frac{3}{2} + \sigma^2 D^{-1} - \frac{\sigma^4}{8} D^{-2} + \dots\qquad(3)$$

So, for Laplacian sources, a first-order approximation is that the rate is inversely proportional to the distortion. Notice that, in an encoder, the parameter that typically regulates distortion is the quantization parameter, so it is sensible to define rate-control algorithms such that the target bit-rate $b^T$ for a picture is inversely proportional to the quantization parameter Q, as represented in Equation (4) as follows:

$$b^T \propto \frac{1}{Q}.\qquad(4)$$

TM5 Explained

In MPEG video, the encoded video sequence consists of three types of pictures, namely, I-, P-, and B-pictures. I-pictures (intra-coded pictures) are independent of other pictures, P-pictures (predictive-coded pictures) are predicted from preceding reference pictures in the sequence, and B-pictures (bidirectionally predictive pictures) are predicted from preceding and/or following reference pictures. The picture type assigned to a given frame is determined by its position within a series of N consecutive pictures (also called a Group of Pictures or GOP). For example, for a GOP size N=15 with two B-pictures between adjacent P-pictures, the GOP can be IBBPBBPBBPBBPBB. Where $n_I$, $n_P$, and $n_B$ refer to the number of I-, P-, and B-pictures in the N pictures, respectively, as represented by Equation (5) as follows:

$$N = n_I + n_P + n_B.\qquad(5)$$

If $b_I^T$, $b_P^T$, and $b_B^T$ represent the quantities of bits targeted by the encoding of I-, P-, and B-pictures, respectively, and $Q_I$, $Q_P$, and $Q_B$ are the average quantization levels of I-,P- and B-pictures, respectively, then a complexity measure, C, can be defined that specifies the trade off between bit-rate and distortion for each picture type according to Equations (6)-(8) as follows:

$$C_I = b_I^T Q_I,\qquad(6)$$

$$C_P = b_P^T Q_P,\qquad(7)$$

$$C_B = b_B^T Q_B.\qquad(8)$$

The target number of bits for a GOP, $R^T$, can be defined according to Equation (9) as follows:

$$R^T = n_I b_I^T + n_P b_P^T + n_B b_B^T.\qquad(9)$$

For constant visual quality across picture types, the relationship among quantizers can be constrained according to Equation (10) as follows:

$$\frac{K_I}{Q_I} = \frac{K_P}{Q_P} = \frac{K_B}{Q_B},\qquad(10)$$

where $K_i$ is a balancing constant. Equation (10) implies the relationships of Equations (11) and (12) as follows:

$$Q_P = \frac{K_P}{K_I} Q_I,\qquad(11)$$

$$Q_B = \frac{K_B}{K_I} Q_I.\qquad(12)$$

Substituting Equations (6)-(8) and (11)-(12) into Equation (9) yields Equation (13) as follows:

$$R_T = K_I b_I^T \left(\frac{n_I}{K_I} + \frac{n_P C_P}{K_P C_I} + \frac{n_B C_B}{K_B C_I}\right).\qquad(13)$$

So the bit-budget $b_I^T$ for an I-picture is given by Equation (14) as follows:

$$b_I^T = \frac{\frac{R^T}{K_I}}{\frac{n_I}{K_I} + \frac{n_P C_P}{K_P C_I} + \frac{n_B C_B}{K_B C_I}}\qquad(14)$$

This equation takes the final TM5 form of Equation (15), when $K_I$ and $n_I$ are both set to one as follows:

$$b_I^T = \frac{R^T}{1 + \frac{n_P C_P}{K_P C_I} + \frac{n_B C_B}{K_B C_I}}\qquad(15)$$

The bit budgets $b_P^T$ and $b_B^T$ for P- and B-pictures can be calculated in a similar way to yield Equations (16) and (17) as follows:

$$b_P^T = \frac{R^T}{n_P + \frac{n_B K_P C_B}{K_B C_P}},\qquad(16)$$

$$b_B^T = \frac{R^T}{n_B + \frac{n_P K_B C_P}{K_P C_B}}. \quad (17)$$

The equations for calculating bit-budgets are the frame-level part of rate control. The second part of TM5 rate control deals with how to assign bits at macroblock level.

A picture in MPEG2 is divided into non-overlapping regions called macroblocks. A macroblock (MB) is composed of four adjacent luminance blocks and their corresponding chrominance blocks (e.g., two such blocks for 4:2:0 chroma sub-sampling).

Given a target bit allocation for a picture, a virtual encoding buffer is employed to determine a reference quantizer scale. We denote $v(j)$ as the number of bits in this virtual buffer, where j denotes a given macroblock.

The virtual buffer is updated according to Equation (18)-(20) as follows:

$$v_I(j) = v_I(0) + B_I(j-1) - \frac{b_I^T(j-1)}{m}, \quad (18)$$

$$v_P(j) = v_P(0) + B_P(j-1) - \frac{b_P^T(j-1)}{m}, \quad (19)$$

$$v_B(j) = v_B(0) + B_B(j-1) - \frac{b_B^T(j-1)}{m}, \quad (20)$$

where $v(0)$ is the initial buffer fullness, $B(j-1)$ is the number of bits generated by encoding all macroblocks in the picture up to and including macroblock $(j-1)$, and m is the total number of macroblocks in the picture. Notice that virtual buffers are defined for each picture type, since different picture types have different complexities. The fullness of the virtual buffer is used to define a quantizer scale for a given macroblock. This is accomplished using Equation (21) as follows:

$$Q_j = \frac{Q^{max} v(j)}{2r}, \quad (21)$$

where $Q_j$ is the quantizer scale, $Q^{max}$ is the maximum quantizer scale (allowed by the standard, e.g., for MPEG2, $Q^{max}=62$ for linear quantization and $Q^{max}=112$ for non-linear quantization) and the reaction parameter r is given by Equation (22) as follows:

$$r = 2\frac{R}{f}, \quad (22)$$

where R is the bit-rate specified for the sequence, and f denotes the frame rate.

The macroblock rate-control step provides a reference quantization scale to encode each macroblock. The reference quantizer scale as defined by Equation (21) is modulated with an activity measure. The idea is that a macroblock that has low activity, such as a flat region, should be quantized more finely than a macroblock with high spatial activity, such as a textured region. This technique is called visual masking and has the goal of equalizing perceptual quality for a given quantizer scale. This yields adaptive quantization.

For macroblock j, an activity measure, $\alpha(j)$, can be calculated in a variety of ways. TM5 calculates $\alpha(j)$ as one plus the minimum of the variances of luminance blocks within a macroblock, where the (16×16) pixel luma block is segmented into four (8×8) frame blocks having frame variances ($\sigma^2$) and four (8×8) field blocks having field variances ($\zeta^2$), as given in Equation (23) as follows:

$$\alpha(j) = 1 + \min(\sigma_0^2, \ldots, \sigma_3^2, \zeta_0^2, \ldots, \zeta_3^2), \quad (23)$$

where:

$$\sigma_0^2 = \sum_{j=0}^{7}\sum_{i=0}^{7}(p(i,j) - \overline{m}_0)^2 \text{ with } \overline{m}_0 = \frac{1}{64}\sum_{j=0}^{7}\sum_{i=0}^{7}p(i,j) \quad (24)$$

$$\sigma_1^2 = \sum_{j=0}^{7}\sum_{i=0}^{7}(p(i+8,j) - \overline{m}_1)^2 \text{ with } \overline{m}_1 = \frac{1}{64}\sum_{j=0}^{7}\sum_{i=0}^{7}p(i+8,j)$$

$$\sigma_2^2 = \sum_{j=0}^{7}\sum_{i=0}^{7}(p(i,j+8) - \overline{m}_2)^2 \text{ with } \overline{m}_2 = \frac{1}{64}\sum_{j=0}^{7}\sum_{i=0}^{7}p(i,j+8)$$

$$\sigma_3^2 = \sum_{j=0}^{7}\sum_{i=0}^{7}(p(i+8,j+8) - \overline{m}_3)^2 \text{ with } \overline{m}_3 = \frac{1}{64}\sum_{j=0}^{7}\sum_{i=0}^{7}p(i+8,j+8)$$

$$\zeta_0^2 = \sum_{j=0}^{7}\sum_{i=0}^{7}(p(2i,2j) - \overline{m}_4)^2 \text{ with } \overline{m}_4 = \frac{1}{64}\sum_{j=0}^{7}\sum_{i=0}^{7}p(2i,2j)$$

$$\zeta_1^2 = \sum_{j=0}^{7}\sum_{i=0}^{7}(p(2i+1,2j) - \overline{m}_5)^2 \text{ with } \overline{m}_5 = \frac{1}{64}\sum_{j=0}^{7}\sum_{i=0}^{7}p(2i+1,2j)$$

$$\zeta_2^2 = \sum_{j=0}^{7}\sum_{i=0}^{7}(p(2i,2j+1) - \overline{m}_6)^2 \text{ with } \overline{m}_6 = \frac{1}{64}\sum_{j=0}^{7}\sum_{i=0}^{7}p(2i,2j+1)$$

$$\zeta_3^2 = \sum_{j=0}^{7}\sum_{i=0}^{7}(p(2i+1,2j+1) - \overline{m}_7)^2 \text{ with } \overline{m}_7 = \frac{1}{64}\sum_{j=0}^{7}\sum_{i=0}^{7}p(2i+1,2j+1)$$

and $p(i,j)$ are the sample values at position $(i,j)$ in the (16×16) luminance block.

A normalized activity measure, $A_\alpha$, is then computed based upon the average of the activity measure, $\overline{\alpha}$, of the last encoded picture of the same type according to Equation (25) as follows:

$$A_\alpha = \frac{2\alpha(j) + \overline{\alpha}}{\alpha(j) + 2\overline{\alpha}}. \quad (25)$$

The actual quantization macroblock scale $Q^S(j)$ is given by Equation (26) as follows:

$$Q^S(j) = \min(Q_j A_\alpha, Q^{max}/2). \quad (26)$$

Based on the discussion above, the TM5 rate-control algorithms can be summarized as follows:

(1) Initialize the number of pictures N and the GOP bit-budget $R^T$. Define the coding structure $n_I$, $n_P$, and $n_B$. Initialize or calculate from previous coded pictures: $b_I$, $b_P$, $b_B$, $Q_I$, $Q_P$, and $Q_B$. In case of initialization, complexities are initialized as:

$$C_I = \frac{160R}{115}, C_P = \frac{60R}{115}, \text{ and } C_B = \frac{42R}{115}.$$

The virtual buffers are initialized as:

$$v_I(0) = \frac{10r}{115}, v_P(0) = \frac{10r}{115}, \text{ and } v_B(0) = \frac{14r}{115}.$$

(2) If the next picture is I-, P-, or B-picture, then compute $b_I^T$, $b_P^T$, or $b_B^T$, respectively.

(3) Given a picture type, determine the quantization level and code the picture to achieve the target rate. Determine $Q^S(j)$ for each macroblock and obtain the coded picture with $b_I = b^T$ bits and update complexities according to $C_I = b_I Q$, where $I \in \{I, P, B\}$.

(4) If the GOP is coded, then stop. Otherwise, decrease the GOP budget by $R^T = R^T - b_I$ for the remaining pictures in the GOP, decrease the appropriate n, picture counter, and return to step (2).

The algorithm proposed by TM5 does not take buffer constraints into account. The MPEG2 specification provides very specific buffer constraints that must be followed by commercial video encoders. These constraints are explained in the following section.

Constant and Variable Bit-Rate Control

At a video decoder, the video bitstream is assumed to be received at a known bit rate and is initially stored into the decoder buffer until the buffer fullness reaches a pre-determined level. This level is denoted by the initial decoder buffer fullness and is directly proportional to start-up delay. When the initial buffer fullness is reached, the decoder instantaneously removes the bits for the first video frame of the sequence, decodes the bits, and displays the frame. The bits for the subsequent frames are also removed, decoded, and displayed instantaneously at subsequent time intervals.

A video buffering verifier (VBV) model referred to as the leaky-bucket model is one way to visualize the encoder's output buffer, i.e., the connector between the encoder and the communication channel. At frame time $t_i$, the encoder instantaneously encodes a frame i into $b_i$ bits and pours these bits into the bucket. Two of the VBV modes of operation are the constant bit-rate (CBR) mode and the variable bit-rate (VBR) mode. These two modes are described in the following sections.

Constant Bit Rate (CBR)

Figure 1A:
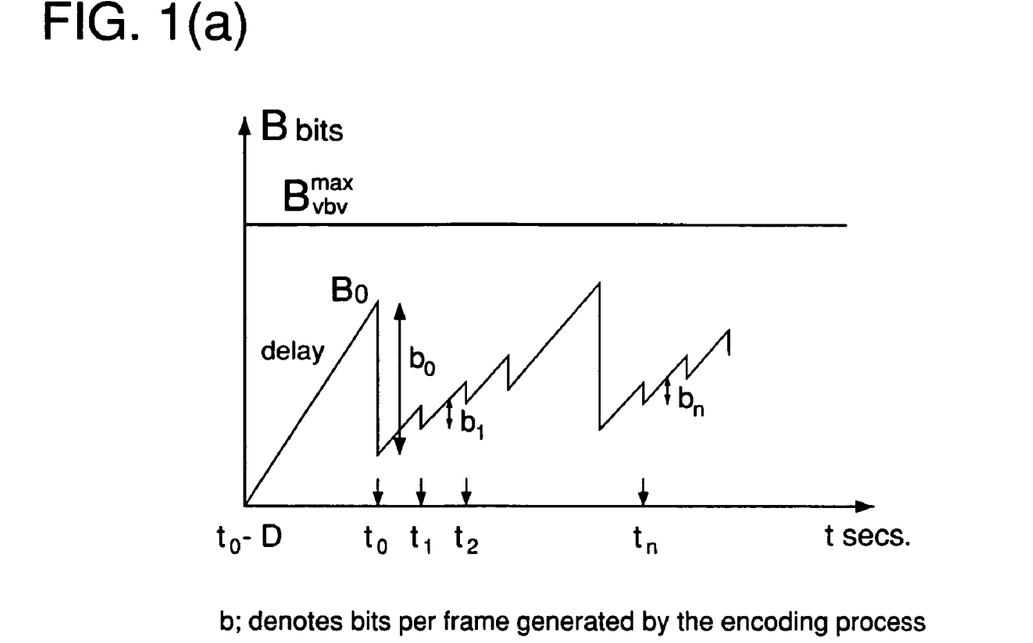
FIGS. 1(a)-(b) show decoder buffer fullness behavior for typical constant bit rate (CBR) and variable bit rate (VBR) rate control algorithms, respectively.

In CBR mode, the leaky bucket drains its accumulated bits into the communication channel at a fixed rate R, and the encoder must produce enough bits so that the leaky bucket does not underflow (i.e., become empty) in any interval of time. In addition, the encoder must not generate so many bits that the leaky bucket, which has a capacity $B_{vbv}^{max}$, overflows. Thus, the leaky bucket, which may begin at arbitrary state $B_D$ (with $0 \leq B_D \leq B_{vbv}^{max}$), has the exemplary behavior as illustrated by FIG. 1(a).

The VBV operates in CBR mode when the leaky bucket operates with (R, $B_{vbv}^{max}$, $B_D$), where:

R=$R_{max}$=the average bit rate;

The value $B_{vbv}^{max}$ is stamped in the bitstream, and VBV fullness never surpasses that value;

The buffer fills up initially with $B_D$, which is stamped in the bitstream; and The VBV fullness behavior follows Equation (27) as follows:

$$B_{vbv}(t+1) = B_{vbv}(t) - b(t) + \frac{R}{f} \text{ for } t = 0, 1, 2, \ldots, \quad (27)$$

where $B_{vbv}(0) = B_D$. Rate control has to ensure that $B_{vbv}(t) \geq b(t)$, while $B_{vbv}(t) \leq B_{vbv}^{max}$, i.e., the decoder buffer does not underflow or overflow. As one can notice, TM5 operates in constant bit rate mode with no consideration of VBV behavior.

Variable Bit Rate (VBR)

Figure 1B:
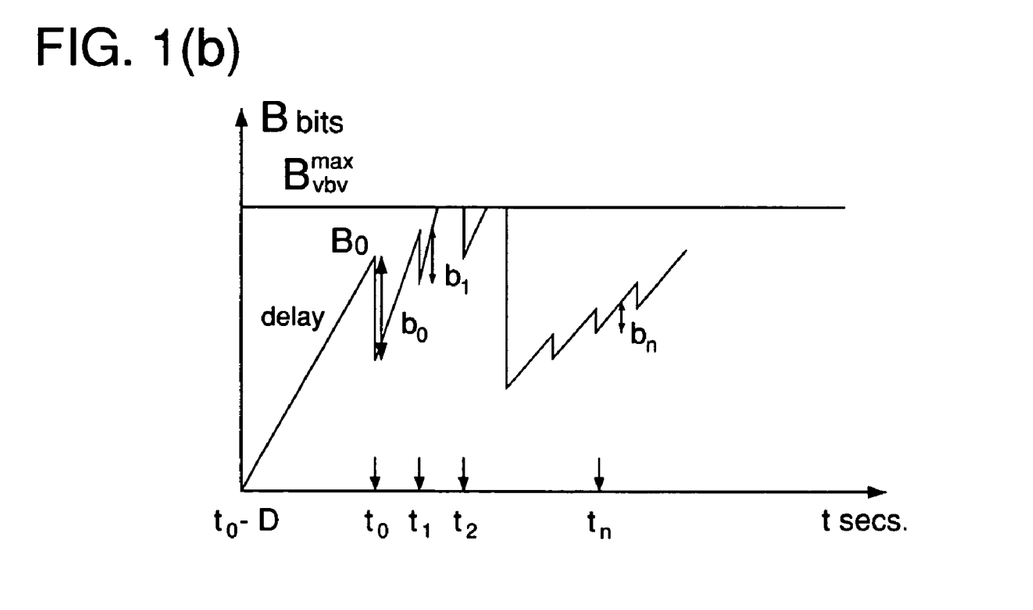

In VBR mode, the VBV operates when the leaky bucket operates with (R, $B_{vbv}^{max}$, $B_D$), where:

R=$R_{max}$=the maximum bit rate, where $R_{max}$ is higher than the average rate of the bitstream;

The value $B_{vbv}^{max}$ is stamped in the bitstream, and VBV fullness is allowed to surpass that value;

The buffer fills up initially with $B_D$, which is stamped in the bitstream; and The VBV fullness behavior follows Equation (28) as follows:

$$B_{vbv}(t+1) = \min\left(\begin{array}{l} B_{vbv}^{max}, \\ B_{vbv}(t) - b(t) + \\ \frac{R_{max}}{f} \end{array}\right) \text{ for } t = 0, 1, 2 \ldots, \quad (28)$$

where $B_{vbv}(0) = B_D$. Rate control has to ensure that $B_{vbv}(t) \geq b(t)$. That is, the encoder must ensure that the decoder buffer does not underflow. However, in VBR mode, it is not necessary to prevent decoder buffer overflows. If the decoder buffer becomes full, then it is assumed that the encoder buffer is drained, and no bits are transmitted from the encoder buffer to the decoder buffer. This behavior is illustrated in FIG. 1(b). At a certain level, VBR is a generalization of CBR.

Video Encoder

Figure 2:
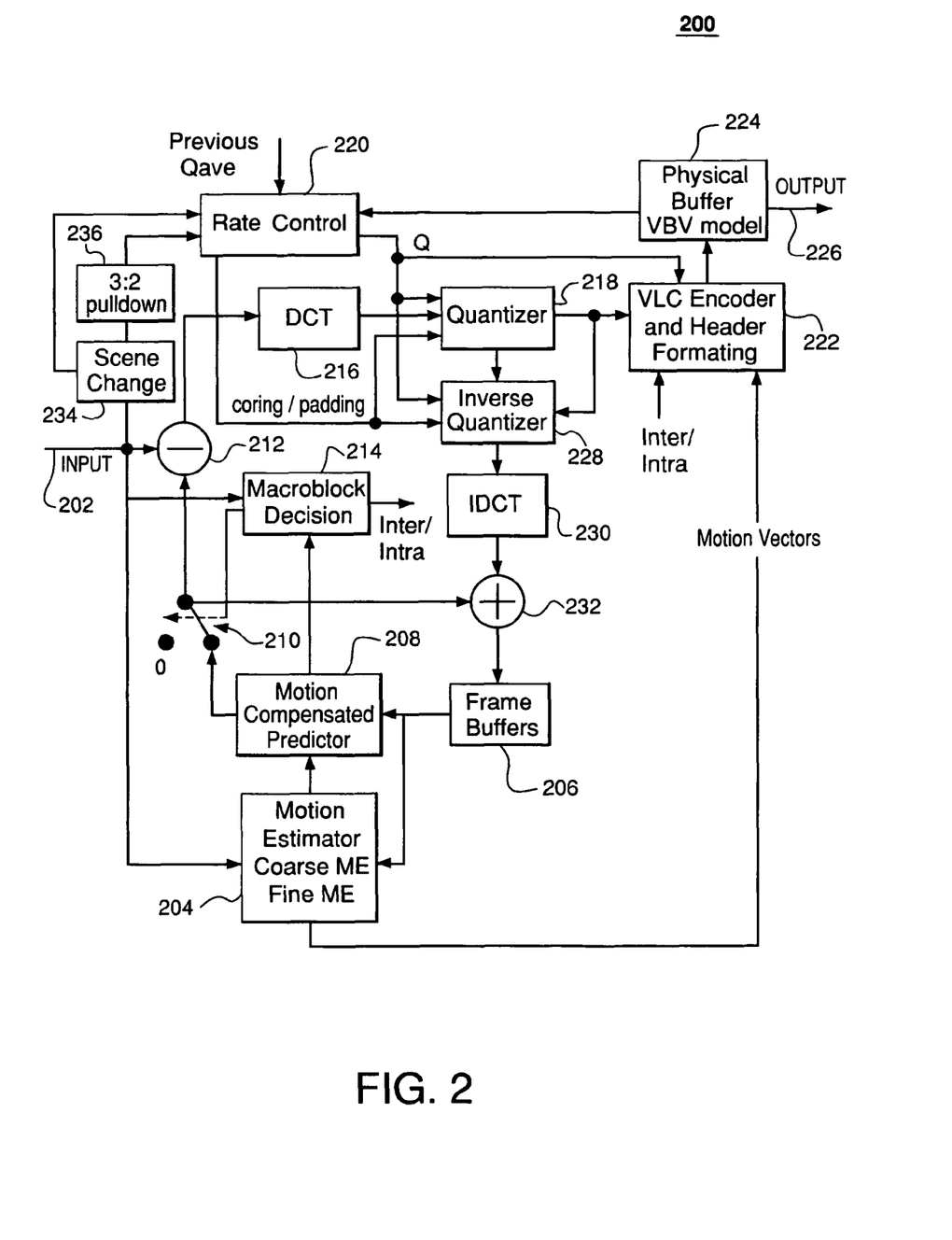
FIG. 2 shows a block diagram of a video encoder, according to one embodiment of the present invention.

FIG. 2 shows a block diagram of video encoder 200, according to one embodiment of the present invention. Unlike the TM5 rate-control algorithm, video encoder 200 implements a rate-control scheme that takes into account pre-processing information like scene change, inverse telecine, visual masking, a posteriori video complexity analysis, and/or VBV compliance. Depending on the implementation, video encoder 200 supports a VBR rate-control algorithm or a CBR rate-control algorithm or both.

Video encoder 200 implements MPEG-like video compression that selectively performs either intra-frame coding of pixels or inter-frame coding of motion-compensated pixel differences. In both cases, the pixel data is DCT transformed, quantized, and variable-length/run-length coded for inclusion in the resulting compressed video bitstream.

In particular, an uncompressed video stream is received at input 202 of video encoder 200 and passed to motion estimator 204, which performs motion estimation between the current frame of video data and reference video data stored in frame buffers 206 to select a motion vector for each macroblock (MB) (e.g., a 16×16 set of pixels) in the current frame. Motion-compensated (MC) predictor 208 applies the selected motion vectors to the reference data from frame buffers 206 to generate motion-compensated reference data that is selectively applied via switch 210 to subtraction node 212, which also receives the uncompressed video stream and generates the difference between the uncompressed video stream and the data received from switch 210.

The state of switch 210 is controlled by macroblock decision block 214, which decides, on a macroblock basis, whether the current video data should be inter-encoded or intra-encoded. If MB decision block 214 decides that a particular MB is to be inter-encoded, then switch 210 is set to pass the motion-compensated reference data from MC predictor 208 to subtraction node 212, which, in that case, outputs MC inter-frame pixel difference data to discrete cosine transform (DCT) 216. If, however, MB decision block 214 decides that a particular MB is to be intra-encoded, then switch 210 is set to pass zeros to subtraction node 212, which, in that case, passes the uncompressed pixel data to DCT 216.

DCT 216 transforms blocks (e.g., (8×8)) of pixel data from the pixel domain into corresponding blocks of DCT coefficient data in a spatial frequency domain. Quantizer 218 quantizes the DCT coefficients based on quantizer values Q received from rate control module 220. The resulting quantized DCT coefficients are then variable-length (e.g., Huffman) and run-length encoded at VLC encoder 222, which also encodes the inter/intra MB decisions from MB decision block 214, the quantizer values Q from rate control block 220, and the selected motion vectors from motion estimator 204. VLC encoder 222 formats all of the various data (including header as well as payload data) into a compressed video bitstream, which is then buffered at physical buffer 224, which also maintains a VBV model of the input buffer at a decoder of the compressed video bitstream. The compressed video bitstream is presented at output 226 for subsequent processing (e.g., combination with compressed audio data, transmission, storage).

The reference data stored in frame buffers 206 is generated by applying inverse quantization at inverse quantizer 228 to the quantized data from quantizer 218, then applying an inverse DCT at IDCT 230 to the dequantized data from inverse quantizer 228, and then adding the resulting pixel data at summation node 232 to corresponding data from switch 210. If the current MB was inter-encoded, then the data from IDCT 230 is decoded inter-frame pixel difference data, and the data from switch 210 is the corresponding MC predicted pixel data. If the current MB was intra-encoded, then the data from IDCT 230 is intra-frame pixel data, and the data from switch 210 is all zeros. In either case, summation node 232 generates reference pixel data for storage in frame buffers 206.

As shown in FIG. 2, rate control block 220 receives VBV fullness data from the VBV model at buffer 224, the average quantization level Qave from the previous frame of the same type (e.g., I, P, B), and data from scene change block 234 and 3:2 pull-down block 236. Scene change block 234 receives the uncompressed video stream and detects scene changes in the video content. 3:2 pull-down block 236 also receives the uncompressed video stream and identifies the phase of 3:2 pull-down in the video stream. The processing of scene change block SR and 3:2 pull-down block 236 are described in further detail in the following two sections. The processing of rate control block 220 is then described in the subsequent sections.

Scene-Change Detection

Scene change can affect rate control in several ways. A scene change may cause a decrease in the visual quality of the first frame encoded after a scene change. As a side-effect, predictive-coded pictures that are based on the frame in which a scene change occurs may also be affected.

At a scene change, the complexity measures defined Equations (6)-(8) may change significantly. As such, more bits should be given for a scene-change frame if there is space in the VBV.

Figure 3:
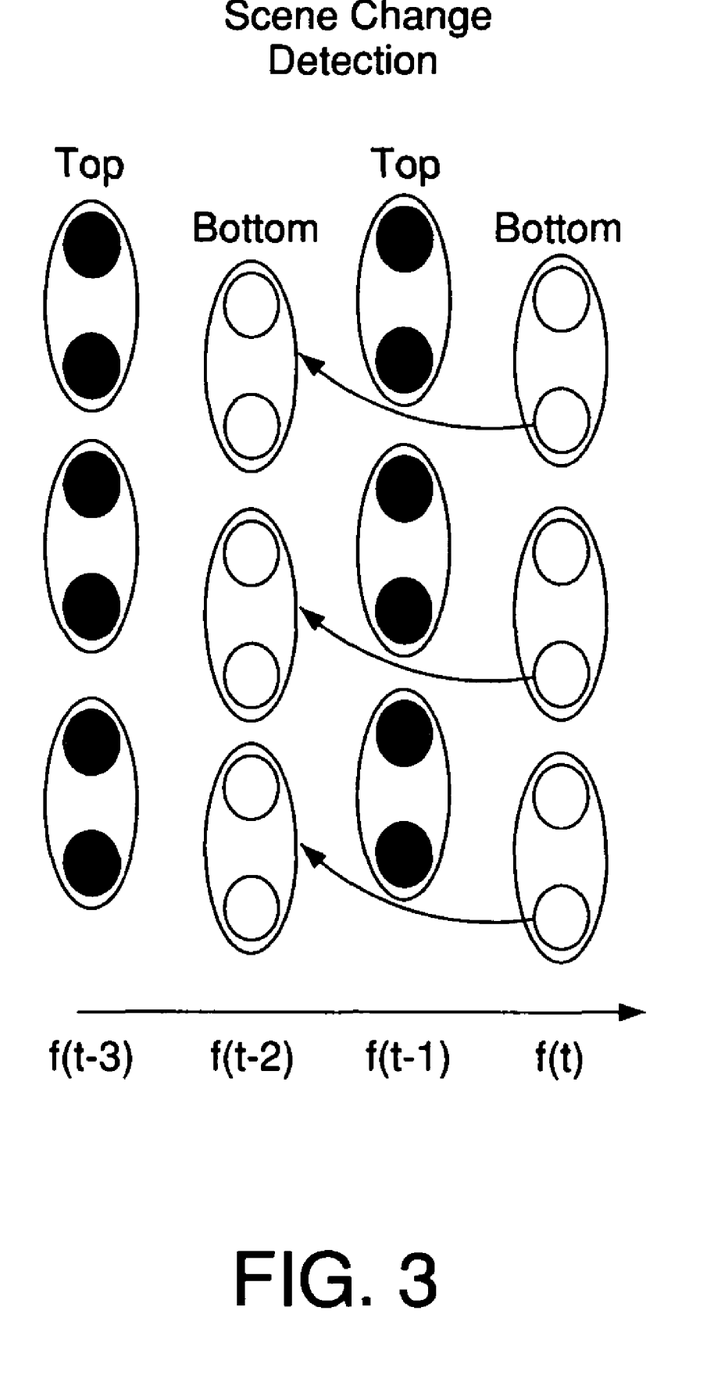
FIG. 3 shows the temporal-spatial relationship between fields and frames for scene change detection.

One possible scene-change detection mechanism is based on the field-difference measure per slice, M(k), calculated by Equation (29) as follows:

$$M(k) = \left| \left( \sum_{y=16k}^{15+16k} \sum_{x=0}^{w} f(x, y, t) \right) - \left( \sum_{y=16k}^{15+16k} \sum_{x=0}^{w} f(x, y, t-2) \right) \right| \text{ for } k = 0, \ldots, \frac{h}{16}, \quad (29)$$

where f(x, y, t) denotes pixel intensity with the triplet (x, y, t) denoting the spatial-temporal coordinates, w denotes picture width (in pixels), and h denotes picture height (in pixels). Notice that this calculation is performed by measuring field segments that have the same video parity, i.e., top and bottom field slice differences are evaluated. This is illustrated in FIG. 3. For example, in a typical standard-definition picture with (720×480) pixels, there are 30 slices, assuming a height of 16 pixels per slice.

After calculation of M(k), a comparison with a threshold T is performed. All the slices with differences that are greater than the threshold are counted. If the number of slices that exceed the threshold corresponds to a picture area that covers more than, e.g., 50% of the picture, then a scene change flag (scene_change) is set, as described in Equation (30) as follows:

$$\text{scene\_change} = \begin{cases} 1 & \text{if number of } M(k) \geq T \text{ exceeds } 50\% \\ 0 & \text{otherwise} \end{cases} \quad (30)$$

Inverse Telecine

Video frames typically consist of two interleaved fields: a top field and a bottom field. Film is usually generated at 24 frames per second (Fps). 24-Fps film may be converted to 30-Fps (e.g., 480i/29.97 Hz) video using a technique called 2-3 pull-down or telecine, where certain fields are repeated in a sequence of four film frames to produce five video frames. The inverse process is called 3-2 pull-down or inverse telecine. An MPEG2 encoder should remove the temporal redundancy associated with repeated fields in order to better use the available bandwidth. This removal may be complex, since it can be very difficult to distinguish actual repeated fields due to noise.

Figure 4:
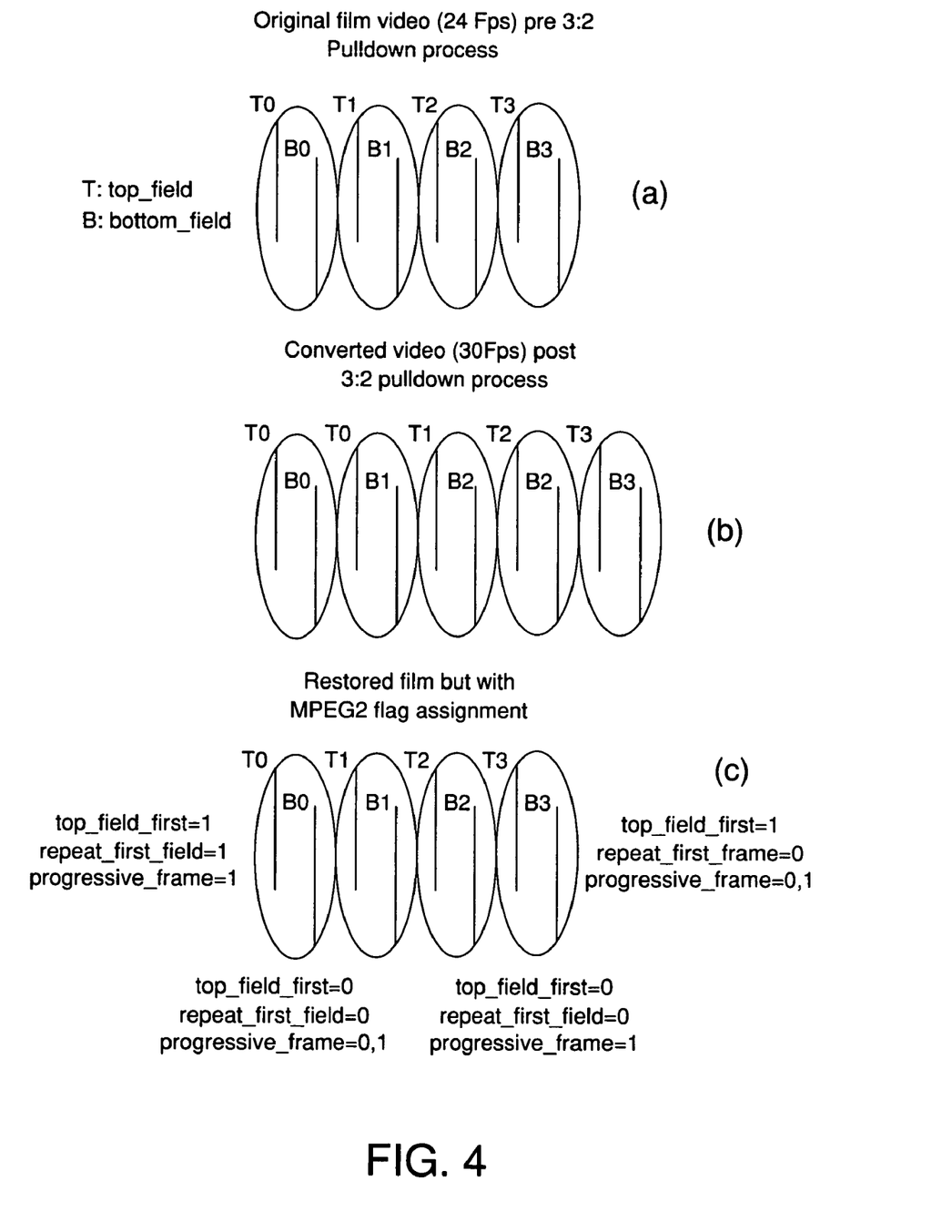
FIG. 4 illustrates the 3-2 and 2-3 pull-down processes.

FIG. 4 illustrates the 3-2 and 2-3 pull-down processes. In particular, FIG. 4(a) illustrates a sequence of four frames of an original, 24-Fps video sequence, where each frame i has a top field Ti and a bottom field Bi. FIG. 4(b) illustrates the five frames of a converted, 30-Fps video sequence generated by applying the 2-3 pull-down process to the four frames of FIG. 4(a). Note that the 2-3 pull-down process repeats the top field T0 of frame 0 and the bottom field B2 of frame 2. Note further that the second frame includes fields T0 and B1, while the third frame includes fields T1 and B2, such that field B1 comes before field T1, while, in the original video sequence of FIG. 4(a), field T1 precedes field B1.

FIG. 4(c) illustrates the four frames that result from applying the 3-2 pull-down process to the five frames of FIG. 4(b) in order to encode the five-frame sequence without having to encode the repeated fields. As shown in FIG. 4(c), MPEG2 has specific flags handling this situation, as follows:

For frame 0:

repeat_first_field=1, indicates that the decoder should decode three fields for this frame instead of two to restore the redundant field removed by preprocessing.

top_field_first=1, indicates that the decoder shall decode the top field of the frame first. It also indicates which field is to be repeated. Note that FIG. 4(b) shows an extra top field for frame 0.

progressive$_{13}$ frame=1, indicates that the top and bottom fields represent the same instant in time.

For frame 1:

repeat_first_field=0, indicates that the decoder shall decode only two fields for this frame, since there are no redundant fields for frame 1.

top_field_first=0, indicates that the decoder should decode the bottom field of the frame first.

progressive_frame=0, 1, indicates that the setting of this flag is not important for this frame, since there are no repeated fields.

For frame 2:

repeat_first_field=1, indicates that the decoder should decode three fields for this frame instead of two to restore the redundant field removed by preprocessing.

top_field_first=0, indicates that the decoder shall decode the bottom field of the frame first. It also indicates which field is to be repeated. Note that FIG. 4(b) shows an extra bottom field for frame 2.

progressive_frame=1, indicates that the top and bottom fields represent the same instant in time.

For frame 3:

repeat_first_field=0, indicates that the decoder shall decode only two fields for this frame.

top_field_first=1, indicates that the decoder should decode the top field of the frame first.

progressive_frame=0, 1, indicates that the setting of this flag is not important for this frame, since there are no repeated fields.

Note that, during the 3-2 pull-down process, the temporal order of fields T1 and B1 is restored.

In order to detect a true 3-2 pull-down cadence with reliability in the presence of noise, slice-based field differences M(k) per Equation (29) are collected, as in the scene-change detector described previously, but where the telecine detector looks for equivalent fields, rather than differing fields. Two slices are considered to match if the field-difference measure M(k) is less than a threshold value T that is used to allow for noise. Two fields are considered to match if more than, e.g., 80% of their slices match, as described in Equation (31) as follows:

$$\text{repeat\_first\_field} = \begin{cases} 1 & \text{if number of } M(k) \le T \text{ exceeds } 80\% \\ 0 & \text{otherwise} \end{cases} \quad (30)$$

where repeat_first_field denotes field equalities.

These field equalities are then recorded in a set R. This set can hold the field equality flags for five frames. As each new frame is processed, two new binary values are added to the set, one for the top field and one for the bottom field. A binary value of '1' indicates equality of fields (i.e., that the current field is a repeat of the previous field of the same type (i.e., top or bottom)), and a binary value of '0' indicates inequality. If the set is full, then the data in the set is shifted to remove the oldest entries to make room for the new data. As soon as the set contains data for five frames, the telecine cadence detection can proceed. Set R is compared with a list of valid patterns (i.e., possible patterns corresponding to the telecine cadence of FIG. 4(b)) shown below:

$S^T(0)=(0, 0, 0, 0, 1, 0, 0, 0, 0, 1);$
$S^T(1)=(0, 0, 1, 0, 0, 0, 0, 1, 0, 0);$
$S^T(2)=(1, 0, 0, 0, 0, 1, 0, 0, 0, 0);$
$S^T(3)=(0, 0, 0, 1, 0, 0, 0, 0, 1, 0);$
$S^T(4)=(0, 1, 0, 0, 0, 0, 1, 0, 0, 0);$
$S^B(0)=(0, 0, 0, 0, 0, 1, 0, 0, 1, 0);$
$S^B(1)=(0, 0, 0, 1, 0, 0, 1, 0, 0, 0);$
$S^B(2)=(0, 1, 0, 0, 1, 0, 0, 0, 0, 0);$
$S^B(3)=(0, 0, 1, 0, 0, 0, 0, 0, 0, 1);$
$S^B(4)=(1, 0, 0, 0, 0, 0, 0, 1, 0, 0).$ where $S^T(i)$ are the patterns that are valid when the video starts with a top field, and $S^B(i)$ are the patterns that are valid when the video starts with a bottom field.

If the set R(t) is equivalent to any one of the sets $S_{0,...4}^{T,B}$, then the two repeated fields are flagged.

This makes the video encoder behave as shown in FIG. 4(c), where the repeated fields are dropped and the remaining fields are reordered for encoding. Notice, that since a given 29.97 Hz video sequence should have a single type of cadence (i.e., whether the first field in the video sequence is a top field or a bottom field), the original parity of the video sequence should be known.

If R(t) is equivalent to set $S^T(1)$, then for the subsequent frames captured at times t+1, t+2, t+3, t+4, t+5, and so on, it should hold that $R(t+1) \equiv S^T(2)$, $R(t+2) \equiv S^T(3)$, $R(t+3) \equiv S^T(4)$, $R(t+4) \equiv S^T(0)$, $R(t+5) \equiv S^T(1)$, and so on.

Likewise, if R(t) is equivalent to set $S^B(1)$, then for the subsequent frames captured at times t+1, t+2, t+3, t+4, t+5, and so on, it should hold that $R(t+1) \equiv S^B(2)$, $R(t+2) \equiv S^B(3)$, $R(t+3) \equiv S^B(4)$, $R(t+4) \equiv S^B(0)$, $R(t+5) \equiv S^B(1)$, and so on.

When the cadence is broken at time t', e.g., due to a scene change or video editing, R(t') is reset to (x, x, x, x, x, x, x, x, 0, 0), where x denotes a binary value that is not yet available. As indicated in FIG. 2, at the occurrence of each scene change, scene change block 234 of FIG. 2 instructs 3:2 pull-down block 236 to reset set R.

Visual Masking

Visual masking is a technique for modulating video compression processing based on the video content to take advantage of some of the characteristics of human vision. For example, human vision is more sensitive to video compression artifacts in imagery having low activity, such as a flat region (e.g., a region having relatively uniform color and/or luminescence), than in imagery having high activity, such as a textured region (e.g., a region having relatively non-uniform color and/or luminescence). As such, in a frame having both flat and textured regions, a video compression algorithm may employ visual masking to allocate more bits to the encoding of the flat regions than to the encoding of the textured regions. This variation in bits is typically accomplished by modulating the quantization level used to quantize different macroblocks based on a measure of the imagery's activity.

In TM5, no visual masking is performed. In the present rate-control model, macroblock bit allocation is based on energy, as indicated by Equation (24). Although activity measures based on local block variance are possible, gradient-based activity calculation is preferred. In one embodiment, the activity measure α(j) is given by Equation (32) as follows:

$$\alpha(j) = 1 + \min(\sigma_h \sigma_v + \sigma_{d_1} + \sigma_{d_2}, \zeta_h + \zeta_v + \zeta_{d_1} + \zeta_{d_2}), \quad (32)$$

where the frame gradients σ and the field gradients ζ are computed in a (16×16) pixel macroblock p(i, j) in four directions: horizontal (h), vertical (v), and two diagonals ($d_1$ and $d_2$), according to Equation (33) as follows:

$$\sigma_h = \sum_{j=0}^{15} \sum_{i=0}^{14} |p(i+1, j) - p(i, j)|; \qquad (33)$$

$$\sigma_v = \sum_{j=0}^{13} \sum_{i=0}^{15} |p(i, j+1) - p(i, j)|;$$

$$\sigma_{d_1} = \sum_{j=0}^{13} \sum_{i=0}^{14} |p(i, j+1) - p(i+1, j)|;$$

$$\sigma_{d_2} = \sum_{j=0}^{13} \sum_{i=0}^{14} |p(i+1, j+1) - p(i, j)|;$$

$$\varsigma_h = \sum_{j=0}^{7} \sum_{i=0}^{14} (|p(i+1, 2j) - p(i, 2j)| + |p(i+1, 2j+1) - p(i, 2j+1)|);$$

$$\varsigma_v = \sum_{j=0}^{6} \sum_{i=0}^{15} (|p(i, 2j+2) - p(i, 2j)| + |p(i+1, 2j+3) - p(i+1, 2j+1)|);$$

$$\varsigma_{d_1} = \sum_{j=0}^{6} \sum_{i=0}^{14} (|p(i, 2j+2) - p(i+1, 2j)| + |p(i, 2j+3) - p(i+1, 2j+1)|);$$

$$\varsigma_{d_2} = \sum_{j=0}^{6} \sum_{i=0}^{14} (|p(i+1, 2j) - p(i, 2j)| + |p(i+1, 2j+1) - p(i, 2j+1)|).$$

Variable Bit Rate

In TM5, as described earlier, no VBV constraints are applied in the picture bit-budget equations for $b_I^T$, $b_P^T$, and $b_B^T$ (i.e., Equations (15)-(17)). This section introduces VBV equations for constraining bit production. This is achieved by bounding not just the target bit budget $b^T$, but also the number of bits used per picture (b). Additionally, the VBR VBV equations introduced here take inverse telecine into account. They are defined by Equation (34) as follows:

$$B_{vbv}(0) = B_D \qquad (34)$$

$$B_{vbv}(t+1) = \begin{cases} \min\left(B_{vbv}^{max}, B_{vbv}(t) - b(t) + \frac{R_{max}}{f}\right), \\ \quad \text{if repeat\_first\_field} = 0; \\ \min\left(B_{vbv}^{max}, B_{vbv}(t) - b(t) + \frac{3R_{max}}{2f}\right), \\ \quad \text{if repeat\_first\_field} = 1. \end{cases}$$

The VBV calculation becomes conditional to the repeat_first_field flag set up by the video preprocessor stage as outlined previously. Equation (34) indicates whether the bit budgets should decrease or increase.

In case of VBR, the target number of bits for a GOP ($R^T$) is defined by Equation (35) as follows:

$$R^T = \frac{NR_{ave}}{f} \text{ with } R_{ave} \le R, \qquad (35)$$

where $R_{ave}$ is the average bit-rate and N is the number of frames in a GOP. In VBR, a peak bit rate R and a long-term average $R_{ave}$ are defined.

Equations (15), (16), and (17) become dependent on the repeat_first_field, scene_change, vbv_underflow, and vbv_overflow flag parameters. The vbv_underflow flag indicates whether the VBV has too few bits, while the vbv_overflow flag indicates whether the VBV has too many bits.

The vbv_underflow flag is used to prevent overproduction of bits and is defined by Equation (36) as follows:

$$\text{vbv\_underflow} = \begin{cases} 1 & \text{if } B_{vbv} \le \beta B_{vbv}^{max}; \\ 0 & \text{otherwise.} \end{cases} \qquad (36)$$

The constant β is a fractional number less than unity (e.g., 0.4). Notice that, for the VBR case, VBV overflow is not a problem. Therefore, the bit-budgets $b_l^T$ with l∈{I, P, B} and target GOP rate $R^T$ are adjusted according to the following equations:

Increase of bit-budget for inverse telecine:

$$b_l^T = \begin{cases} b_l^T + \rho(l) b_l^T \text{ with } R^T = R^T + \rho(l) b_l^T \text{ if} \\ \quad \text{repeat\_first\_field} = 1 \text{ and vbv\_underflow} = 0; \\ b_l^T \text{ otherwise.} \end{cases} \qquad (37)$$

Increase of bit-budget for scene change:

$$b_l^T = \begin{cases} b_l^T + \vartheta(l) b_l^T \text{ with } R^T = R^T + \vartheta(l) b_l^T \text{ if} \\ \quad \text{scene\_change} = 1 \text{ and vbv\_underflow} = 0; \\ b_l^T \text{ otherwise.} \end{cases} \qquad (38)$$

Increase of bit-budget for decreasing average quantizer scale:

$$b_l^T = \begin{cases} b_l^T + \varphi(l) b_l^T \text{ with } R^T = R^T + \varphi(l) b_l^T \text{ if scene\_change} = 0, \\ \quad \text{repeat\_first\_field} = 0, \\ \quad \text{vbv\_underflow} = 0, \\ \quad \text{and} \\ \quad Q_s^{ave}(l) > Q_s^{thr}(l, R); \\ b_l^T \text{ otherwise.} \end{cases} \qquad (39)$$

Decrease of bit-budget for preventing VBV underflow:

$$b_l^T = \begin{cases} b_l^T - \phi(l) b_l^T \text{ with } R^T = R^T - \phi(l) b_l^T \text{ if vbv\_underflow} = 1; \\ b_l^T \text{ otherwise.} \end{cases} \qquad (40)$$

Notice that, if scene_change=1, then it follows that repeat_first_frame=0, since the inverse telecine is reset upon detection of a scene change. In one implementation, the weighting factors in Equations (37)-(40) are as follows:

σ(I)=0.167, σ(P)=0.333, and σ(B)=0.333;

θ(I)=0.250, θ(P)=0.750, and θ(B)=0.750;

φ(I)=0.015, φ(P)=0.065, and φ(B)=0.065;

ϕ(I)=0500, ϕ(P)=0.250, and ϕ(B)=0.250.

Equation (39) adjusts the bit-budget if the average quantizer value $Q_S^{ave}(1)$ is below the given maximum perceptual value $Q_S^{thr}(1, R)$. This value depends on the peak rate R and the picture type and is an a posteriori adjustment of the quantization that affects the average quantization after a frame has been encoded, since $Q_S^{ave}(1)$ was calculated for the previous frame with the same picture type.

The following changes in the macroblock-level rate control, together with Equations (37)-(40), help to prevent VBV underflow. Equations (18)-(20) are used in the macroblock rate control. Using the fullness of this buffer in Equation (21), the quantizer scale $Q^j$ can be defined. Defining the instantaneous decrease in VBV fullness according to Equation (41) as follows:

$$B_i(j+1) = B_{vbv} - b(j), \quad (41)$$

where j denotes the current macroblock to be quantized, and b(j−1) denotes the number of bits used to encode the previous (j−1) macroblocks.

By monitoring the quantity $B_i$ (j+1), the possibility of underflow can be prevented by increasing the average quantizer level, i.e., by adding a bias to the actual quantization macroblock scale $Q^S$ (j), according to Equation (42) as follows:

$$Q^S(j) = \min(\min(Q_j A_\alpha, Q^{max}/2) + Q_{bias}, Q^{max}/2), \quad (42)$$

with activity measure α( ) defined by Equation (32).

In one implementation, the bias $Q_{bias}$ is defined according to Equation (43) as follows:

$$Q_{bias} = \begin{cases} 8 & \text{if } 0.5B_{vbv}^{max} \le B_i(j+1) < 0.6B_{vbv}^{max}; \\ 16 & \text{if } 0.4B_{vbv}^{max} \le B_i(j+1) < 0.5B_{vbv}^{max}; \\ 20 & \text{if } 0.3B_{vbv}^{max} \le B_i(j+1) < 0.4B_{vbv}^{max}; \\ 24 & \text{if } 0.2B_{vbv}^{max} \le B_i(j+1) < 0.3B_{vbv}^{max}; \\ 28 & \text{if } 0.1B_{vbv}^{max} \le B_i(j+1) < 0.2B_{vbv}^{max}; \\ 32 & \text{if } 0 \le B_i(j+1) < 0.2B_{vbv}^{max}; \\ 0 & \text{otherwise.} \end{cases} \quad (43)$$

Constant Bit Rate

In addition to the constraints already described for VBR, CBR prevents VBV overflow (i.e., underproduction of bits by the encoder). For that purpose, the flag vbv_overflow is defined according to Equation (44) as follows:

$$\text{vbv\_overflow} = \begin{cases} 1 & \text{if } B_{vbv} \ge \gamma B_{vbv}^{max}; \\ 0 & \text{otherwise,} \end{cases} \quad (44)$$

where γ is a fractional number less than unity (e.g., 0.95). The CBR VBV equations are defined according to Equation (45) as follows:

$$B_{vbv}(0) = B_D \quad (45)$$

$$B_{vbv}(t+1) = \begin{cases} B_{vbv}(t) - b(t) + \dfrac{R}{f}, & \text{if repeat\_first\_field} = 0; \\ B_{vbv}(t) - b(t) + \dfrac{3R}{2f}, & \text{if repeat\_first\_field} = 1. \end{cases}$$

Equations (37)-(40) can also be used in CBR mode; however, the weighting factors should be chosen in a more conservative way (i.e., smaller values) than for the VBR mode.

In case of VBV overflow, padding bits can be added to the end of the picture being encoded. The VBV fullness after encoding all macroblocks in the picture is given by Equation (45). The number of padding bits (P) can be defined according to Equation (46) as follows:

$$P(t+1) = \begin{cases} B_{vbv}(t+1) - 0.95 B_{vbv}^{max} & \text{if } B_{vbv}(t+1) > 0.95 B_{vbv}^{max}; \\ 0 & \text{otherwise.} \end{cases} \quad (46)$$

Rate-Control Algorithms

Figure 5:
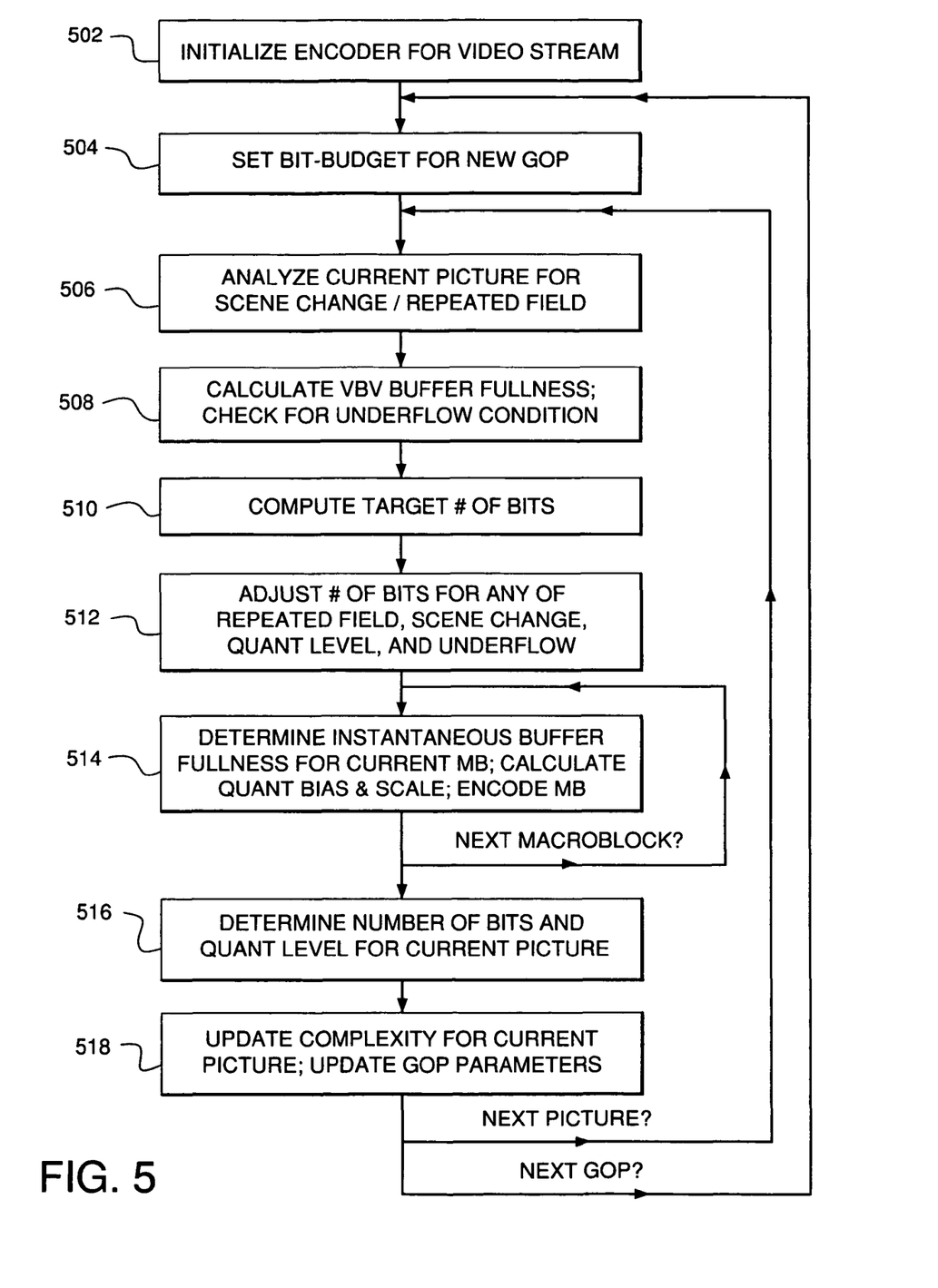
FIG. 5 shows a flow diagram of a video compression algorithm with VBR rate-control implemented by the video encoder of FIG. 2 to compress a digital video stream, according to one embodiment of the present invention.

FIG. 5 shows a flow diagram of a video compression algorithm with VBR rate-control implemented by video encoder 200 of FIG. 2 to compress a digital video stream, according to one embodiment of the present invention. As depicted in FIG. 5, the video compression algorithm has three nested loops: an outer loop that sequentially processes the GOPs in the video stream, an intermediate loop that sequentially processes the pictures in the current GOP, and an inner loop the sequentially processes the macroblocks in the current picture. The inner loop is repeated until all of the macroblocks in the current picture have been processed, the intermediate loop is repeated until all of the pictures in the current GOP have been processed, and the output loop is repeated until all of the GOPs in the video stream have been processed.

In particular, the video compression algorithm begins by initializing the video encoder for the video stream (step 502 of FIG. 5). This video stream initialization involves the following steps:

Define the GOP coding structure including the number of pictures per GOP (A) and the numbers of I, P, and B pictures per GOP ($n_I$, $n_P$, and $n_B$);

Specify the GOP bit-budget $R^T$;

Initialize complexities for I, P, and B pictures, e.g., as:

$$C_I = \frac{160R}{115}, C_P = \frac{60R}{115}, \text{ and } C_B = \frac{42R}{115},$$

where R is the bit-rate specified for the video stream;

Initialize the virtual encoding buffers for I, P, and B pictures, e.g., as:

$$v_I(0) = \frac{10r}{115}, v_P(0) = \frac{10r}{115}, \text{ and } v_B(0) = \frac{14r}{115},$$

where r is a reaction parameter given by Equation (22); and

Initialize the VBV buffer fullness $B_{vbv}(0)$ according to Equation (34).

For each new GOP in the video stream, the video encoder sets the GOP bit-budget $R^T$ (per Equation (35)) (step 504).

For each new picture in the current GOP, the video encoder performs the following (note that the sequence of these steps may vary for different implementations):

Determine whether the current picture corresponds to a scene change (per Equation (30)) and/or a repeated field (per Equation (31)) (step 506);

Calculate the VBV buffer fullness (per Equation (34)) and check for underflow condition (per Equation (36)) (step 508);

Compute target bit-budget for encoding current picture (per Equation (15), (16), or (17) (step 510); and Adjust target bit-budget for any of repeated field, scene change, quantization level control, and underflow (per Equations (37)-(40)) (step 512).

For each macroblock (MB) j in the current picture, the video encoder calculates the instantaneous VBV buffer fullness $B_i(j)$ (per Equation (41)), the quantization bias $Q_{bias}$ (per Equation (43)), and the quantizer scale $Q^S(j)$ (per Equation (42)), and then encodes the current MB (step 514).

After the last MB in the current frame has been processed, the video encoder performs the following:

Determine the number of bits and average quantization level used to encode the current picture (step 516);

Update the complexity for the current picture type (per Equation (6), (7), or (8)), decrease the GOP budget $R^T$ according to $R^T=R^T-b_i$ for the remaining pictures in the GOP, and decrease the appropriate ni picture counter (step 518). Note that, in case of a scene change, picture complexities are reset to their initial values.

Figure 6:
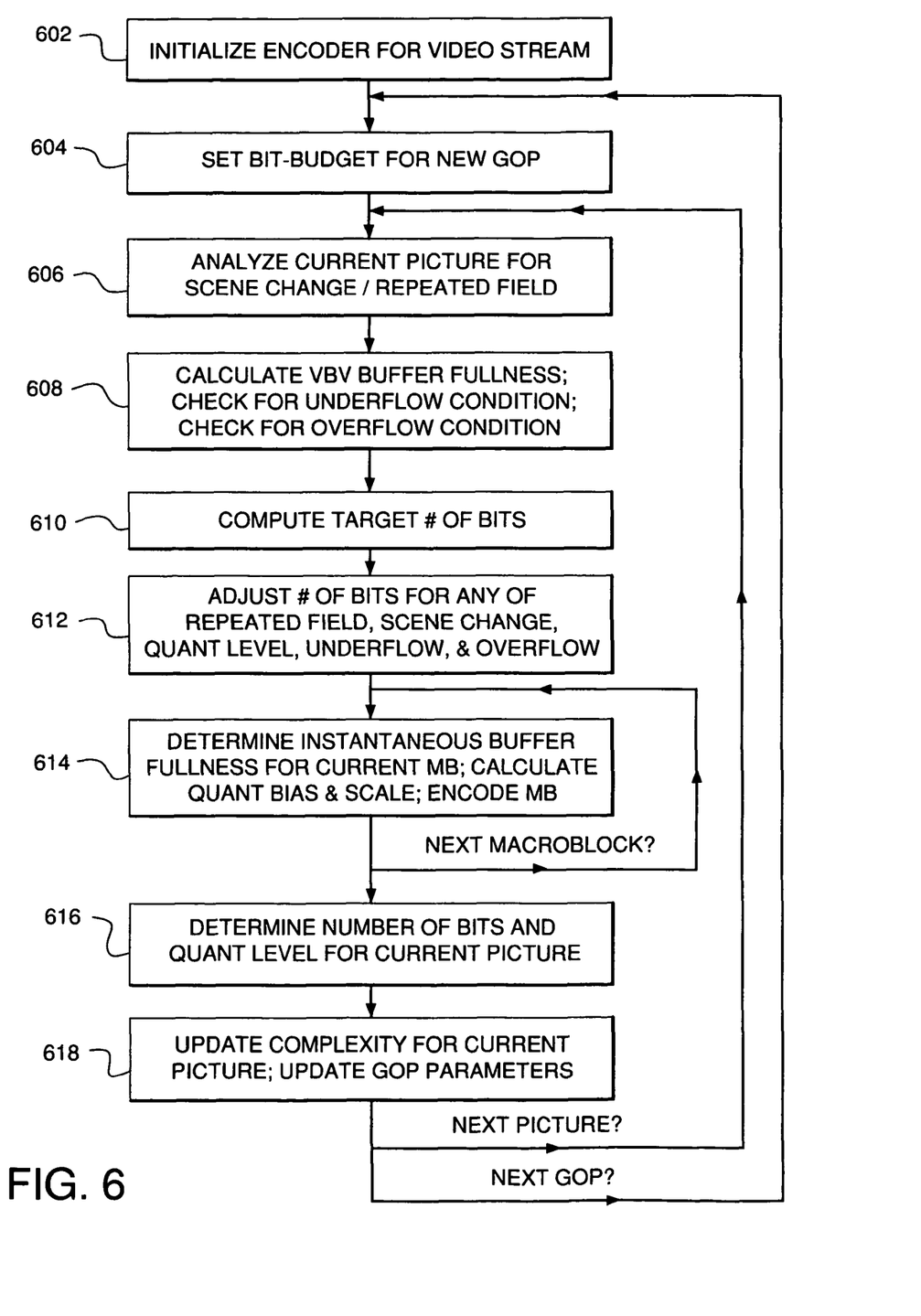
FIG. 6 shows a flow diagram of a video compression algorithm with CBR rate-control implemented by the video encoder of FIG. 2 to compress a digital video stream, according to another embodiment of the present invention.

FIG. 6 shows a flow diagram of a CBR rate-control algorithm implemented by the video encoder 200 of FIG. 2, according to another embodiment of the present invention. Steps 602-618 of the CBR rate-control algorithm are identical to the corresponding steps of the VBR algorithm of FIG. 5, but with the addition of overflow detection (per Equation (44)) (step 608) and the padding adjustment for overflow prevention (per Equation (46)) (step 612).

Alternatives

The previous discussion describes VBR and CBR rate-control algorithms for the MPEG2 video standard. Video pre-processor results, such as scene-change and/or inverse-telecine detection, are used to modify the rate-control strategy in these algorithms, if appropriate.

VBV underflow is prevented by increasing quantization scale. Another possible strategy is to 20 define coring functions in the DCT domain. A coring function is a non-linear function. If $F(\omega)$ represents the transform coefficients of an inter-coded or intra-coded macroblock, then the output $G(\omega)$ of a coring function could be given by Equation (48) as follows:

$$G(\omega) = \begin{cases} F(\omega), & \text{if } |F(\omega)| > T(B_{vbv}); \\ 0, & \text{otherwise,} \end{cases} \quad (48)$$

where T(.) is a threshold function dependent of the VBV buffer fullness $B_{vbv}$. As the VBV buffer decreases, the value T should increase. In this way, we could filter out the DCT coefficients that are less relevant in a VBV buffer underflow situation. This has the effect of lowering the bit rate of the current macroblock being coded. This mechanism is more graceful than adding a bias term to the quantizer scale. An exemplary threshold function T(.) is given by Equation (49) as follows:

$$T(B_{vbv}) = k \frac{B_{vbv}^{max}}{B_{vbv}}, \quad (49)$$

where k is a specified constant, e.g., $0 \leq k \leq 8$.

VBV overflow is prevented by adding padding bits, as appropriate, after the coded frame is produced by the encoder.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A method comprising applying a video compression algorithm by a circuit to a digital video stream having video content to generate a compressed video bitstream, wherein:

the video compression algorithm includes rate control adapted to control size of the compressed video bitstream; and the rate control takes into account two or more of (1) detected scene changes, (2) detected repeated fields resulting from inverse telecine processing, (3) characterized video content complexity, and (4) a determined level of a model of a bit buffer associated with a decoder adapted to decode the compressed video bitstream; and wherein the rate control allocates additional bits for encoding a repeated field and a determined bit buffer model level that corresponds to storing at least one byte.

2. The invention of claim 1, wherein the rate control changes allocation of bits for encoding different portions of the video stream having particular combinations of characteristics associated with one of (1) the detected scene changes, and (2) the characterized video content complexity.

3. The invention of claim 2, wherein the rate control allocates additional bits for encoding a portion of the video stream if the portion is both associated with a detected scene change and associated with a determined bit buffer model level that corresponds to storing at least one byte.

4. The invention of claim 2, wherein the rate control allocates additional bits for encoding a portion of the video stream if the portion is associated with a determined bit buffer model level that corresponds to storing at least one byte associated with decreasing characterized video content complexity.

5. The invention of claim 1, wherein:
the rate control takes into account (1) the detected scene changes, (2) the detected repeated fields, (3) the characterized video content complexity, and (4) the determined bit buffer model level;
the method comprises:
analyzing the video stream to detect scene changes in the video content;
analyzing the video stream to detect repeated fields resulting from the inverse telecine processing;
analyzing the video stream to characterize complexity of the video content;
and maintaining the model of the bit buffer associated with the decoder for the compressed video bitstream to determine bit buffer model level.

6. The invention of claim 5, wherein the rate control changes allocation of bits for encoding different portions of the video stream having particular combinations of characteristics associated with two or more of (1) the detected scene changes, (2) the detected repeated fields, (3) the characterized video content complexity, and (4) the determined bit buffer model level.

7. The invention of claim 5, wherein, if a scene change is detected, then the analysis of the video stream for repeated fields is reset.

8. The invention of claim 5, wherein:
the rate control allocates additional bits to encode a portion of the video stream if the portion is:
(1) both (i) associated with a detected repeated field and (ii) associated with a determined bit buffer model level that corresponds to storing at least one byte; or
(2) both (i) associated with a detected scene change and (ii) associated with a determined bit buffer model level that corresponds to storing at least one byte.

9. The invention of claim 8, wherein the rate control allocates fewer bits to encode the portion of the video stream if the portion is associated with a determined bit buffer model level that does correspond to an underflow condition.

10. The invention of claim 8, wherein the rate control adds padding bits to encode the portion of the video stream if the portion is associated with a determined bit buffer model level that corresponds to an overflow condition.

11. The invention of claim 5, wherein the bit buffer model level is increased more for portions of the video stream associated with the detected repeated fields than for portions of the video stream not associated with the detected repeated fields.

12. The invention of claim 1, wherein the rate control selects quantization levels used to quantize DCT coefficients corresponding to DCT-transformed pixel data to control the size of the compressed video bitstream.

13. The invention of claim 12, wherein, if a non-zero quantized DCT coefficient is less than a specified threshold, then the quantized DCT coefficient is set to zero.

14. The invention of claim 13, wherein the magnitude of the specified threshold is a function of the determined bit buffer model level.

15. The invention of claim 12, wherein the selection of quantization levels is a function of the determined bit buffer model level.

16. The invention of claim 15, wherein:
the quantization level for each macroblock is selected based on a function that includes a bias term;
and the bias term is a function of the determined bit buffer model level.

17. The invention of claim 1, wherein the compressed video bitstream conforms to an MPEG video compression standard.

18. The invention of claim 17, wherein the MPEG video compression standard is MPEG2.

19. A video encoder for applying a video compression algorithm to a digital video stream having video content to generate a compressed video bitstream, wherein:
the video compression algorithm includes rate control adapted to control size of the compressed video bitstream;
and the rate control takes into account two or more of (1) detected scene changes, (2) detected repeated fields resulting from inverse telecine processing, (3) characterized video content complexity, and (4) a determined level of a model of a bit buffer associated with a decoder adapted to decode the compressed video bitstream; said video encoder further comprising:
a circuit for generating a plurality of indicators indicative of differences between a plurality of slices in a field and a corresponding plurality of slices in another field.

20. A computer-readable medium, having encoded thereon program code, wherein, when the program code is executed by a machine, the machine implements a method comprising applying a video compression algorithm to a digital video stream having video content to generate a compressed video bitstream, wherein:
the video compression algorithm includes rate control adapted to control size of the compressed video bitstream;
and the rate control takes into account two or more of (1) detected scene changes, (2) detected repeated fields resulting from inverse telecine processing, (3) characterized video content complexity, and (4) a determined level of a model of a bit buffer associated with a decoder adapted to decode the compressed video bitstream; and
wherein a plurality of indicators indicative of differences between a plurality of slices in a field and a corresponding plurality of slices in another field are generated.

21. A computer-readable medium, having encoded thereon a compressed video bitstream generated by applying a video compression algorithm to a digital video stream having video content, wherein:
the video compression algorithm includes rate control adapted to control size of the compressed video bitstream;
and the rate control takes into account two or more of (1) detected scene changes, (2) detected repeated fields resulting from inverse telecine processing, (3) characterized video content complexity, and (4) a determined level of a model of a bit buffer associated with a decoder adapted to decode the compressed video bitstream; and
a plurality of indicators indicative of differences between a plurality of slices in a field and another field are generated.

22. The video encoder of claim 19, wherein scene changes are detected based on the plurality of indicators.

23. The video encoder of claim 22, wherein a scene change is detected if a portion of the plurality of the indicators exceeding a predetermined threshold correspond to slices covering an area of the field exceeding another predetermined threshold.

24. The video encoder of claim 19, wherein repeated fields are detected based on the plurality of indicators.

25. The video encoder of claim 24, wherein repeated fields are detected if a portion of the plurality of indicators less than a predetermined threshold correspond to slices covering an area of the field exceeding another predetermined threshold.

26. The invention of claim 5, further comprising:
generating a plurality of indicators indicative of differences between a plurality of slices in a field and another field; and wherein
analyzing the video stream to detect scene changes in the video content further comprises:
detecting a scene change if a portion of the plurality of the indicators exceeding a predetermined threshold correspond to slices covering an area of the field exceeding another predetermined threshold; and
wherein analyzing the video stream to detect repeated fields resulting from the inverse telecine processing further comprises:
wherein repeated fields are detected if a portion of the plurality of indicators less than a predetermined threshold correspond to slices covering an area of the field exceeding another predetermined threshold.

\* \* \* \* \*